United States Patent

Zavilla

[11] Patent Number: 5,875,695
[45] Date of Patent: Mar. 2, 1999

[54] DRUM BRAKE TOOL

[76] Inventor: Terry Gerard Zavilla, 5300 Granite Dr., Hilliard, Ohio 43026

[21] Appl. No.: 929,450

[22] Filed: Sep. 15, 1997

[51] Int. Cl.[6] .................................................... B25B 11/00
[52] U.S. Cl. ................................ 81/488; 81/119; 81/484; 7/100
[58] Field of Search ............................. 81/488, 119, 484, 81/485; 7/100, 170; 254/131, 133 R

[56]  References Cited

U.S. PATENT DOCUMENTS

| | | | |
|---|---|---|---|
| 100,686 | 3/1870 | Stamp | 7/170 |
| 1,488,843 | 4/1924 | Stoll et al. | 81/119 |
| 1,493,389 | 5/1924 | Rosenfield | 81/3.4 |
| 2,539,711 | 1/1951 | Varabeau | 254/131 |
| 3,874,256 | 4/1975 | Korb, Jr. et al. | 81/484 |
| 4,211,446 | 7/1980 | Shultz, Sr. | 254/131 |
| 4,334,669 | 6/1982 | Ross | 254/131 |
| 4,922,771 | 5/1990 | Campbell | 81/484 |
| 5,178,034 | 1/1993 | Reasoner | 74/502.6 |
| 5,211,352 | 5/1993 | Meyer et al. | 242/107 |
| 5,235,867 | 8/1993 | Wortmann et la. | 74/501.56 |
| 5,404,971 | 4/1995 | Hayakawa | 188/196 BA |

*Primary Examiner*—David A. Scherbel
*Assistant Examiner*—Joni B. Danganan
*Attorney, Agent, or Firm*—David L. Volk

[57] ABSTRACT

A rigid elongated member with a first end and a second end has a handle disposed at the first end. A substantially straight shank portion protrudes from the handle and can either be notched or smooth. The elongated member extends past the shank to further form an arcuate segment near the second end of the tool. The tool terminates at the second end with a straight segment which is coaxial with the shank.

3 Claims, 3 Drawing Sheets

DRUM BRAKE TOOL

BACKGROUND OF THE INVENTION

1. Field of the Invention

This invention relates to hand tools. More particularly, it relates to hand tools designed to facilitate the performance of automotive maintenance and repairs.

2. Description of the Related Art

There is currently no tool on the market that effectively performs the function the current invention is designed to accomplish. Most drum brake assemblies include a ratchet wheel fixedly attached to a sleeve that is threadedly connected to a shaft. The sleeve and the shaft are connected to brake shoes and operate in tandem to maintain a tolerance between a brake lining and a drum. When the ratchet wheel, and correspondingly, the sleeve to which it is attached, are rotated in one direction, the shoes are pushed closer to the drum. When the ratchet wheel is rotated in the opposite direction, the shoes are pulled away from the drum.

In most drum brake assemblies, a ratchet pawl restricts the ratchet wheel so that it is only permitted to rotate in the direction that pushes the brake shoes closer to the drum. When the brake shoes need to be replaced, however, the shoes must be pulled away from the drum so that the drum may be removed. This requires the ratchet wheel to be rotated in the direction that the ratchet pawl is designed to prevent. This forced rotation can cause serious damage to both the ratchet wheel and the pawl.

What is needed is a tool, shaped to conform to the interior of the drum brake assembly, for disengaging the pawl from the ratchet wheel. This capability will permit the ratchet wheel to be rotated in the direction required to withdraw the brake shoes from the drum, without damaging the ratchet wheel and the pawl.

SUMMARY OF THE INVENTION

The drum brake tool of the present invention includes a rigid elongated member which has a first end and a second end. A handle is positioned at the first end of the elongated member and a substantially straight shank portion protrudes from it. This shank portion can either be notched or smooth. The notched shank is used to hold the tool in a fixed position with the pawl disengaged, leaving both hands of the mechanic free to rotate the ratchet wheel. The elongated member extends past the shank to form an arcuate segment a predetermined distance from the second end of the tool. The tool terminates at the second end with a straight segment which is coaxial with the shank.

Because the tool contains an arcuate segment, which is adapted to fit around the threaded shaft mechanism of the drum brake assembly, the tool is easily manipulated within the drum brake assembly. This ease of use greatly reduces the amount of time required to remove the brake drum from the braking assembly. Because the shaft can be notched, it is possible to engage the tool and leave it engaged while using both hands to rotate the ratchet wheel.

Still further features and advantages will become apparent from the ensuing description and drawings.

DETAILED DESCRIPTION

Figure 1:
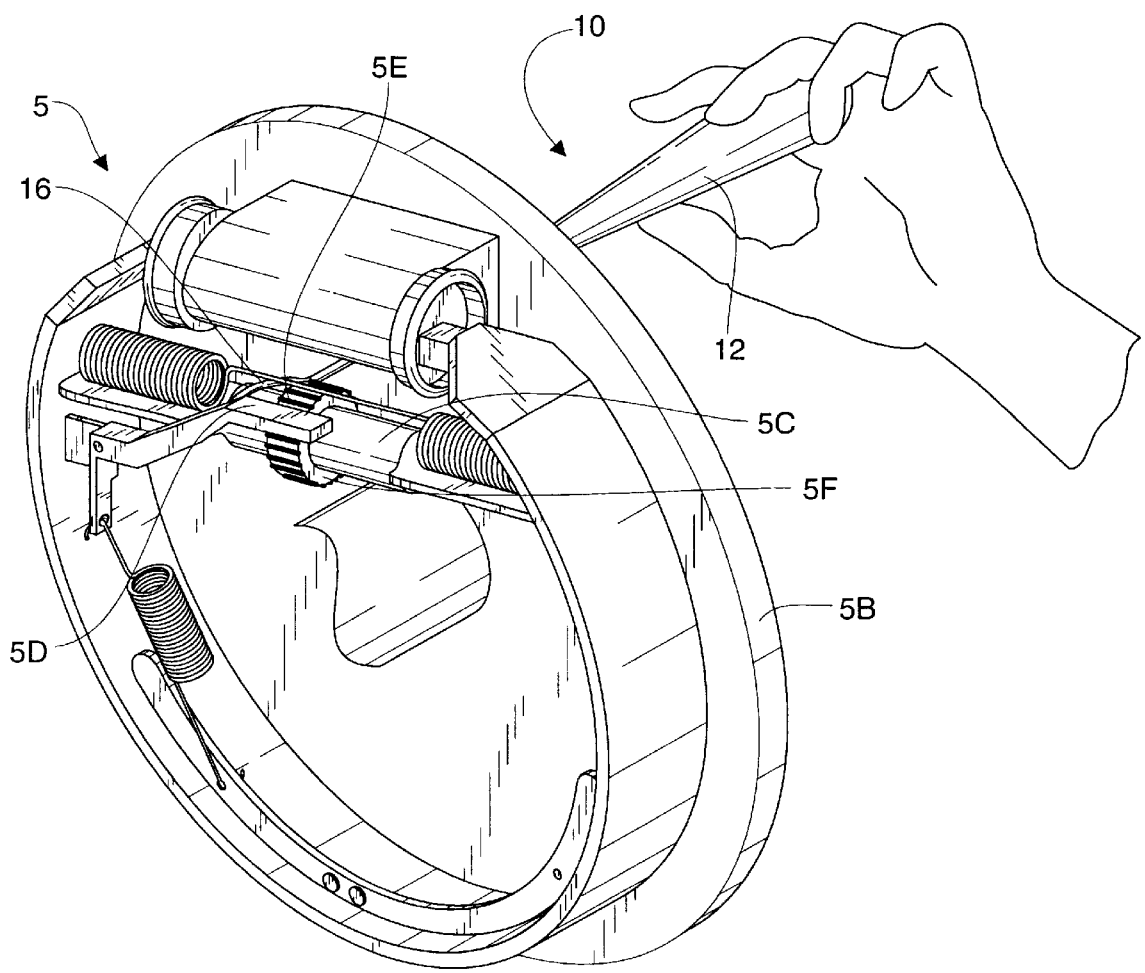
FIG. 1 is a perspective view of a drum brake assembly 5 with a drum brake tool 10 of the present invention shown performing its intended function. The drum is removed for clarity.
Figure 2:
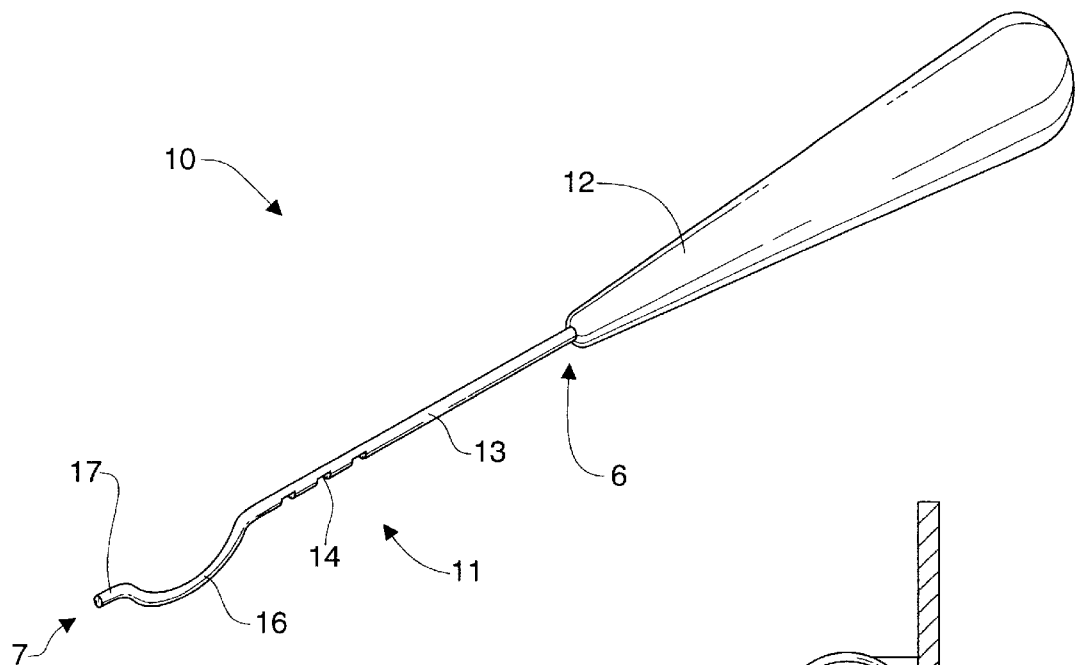
FIG. 2 is a perspective view of the drum brake tool 10 of the present invention with a notched shank portion 13.
Figure 3:
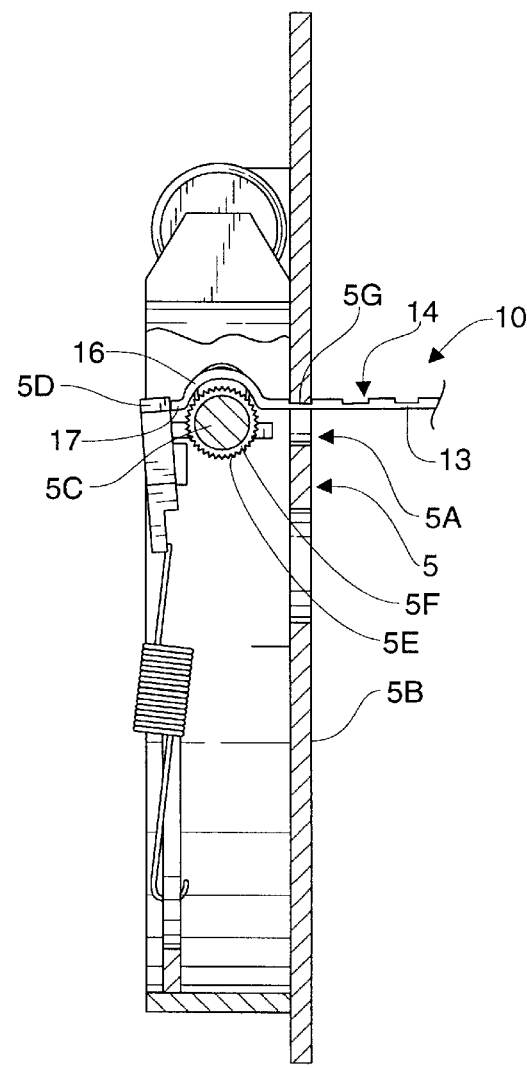
FIG. 3 is a cross. sectional view of a drum brake assembly 5 with the tool 10 of the present invention shown performing its intended function.

FIG. 1 is a perspective view of a drum brake assembly 5 with a drum brake tool 10 of the present invention shown performing its intended function. FIG. 2 is a perspective view of the drum brake tool 10 of the present invention with a notched shank portion 13. FIG. 3 is a cross-sectional view of a drum brake assembly 5 with the tool 10 of the present invention shown performing its intended function. Referring to FIGS. 1–3, the drum brake tool 10 of the present invention includes a rigid elongated member 11 having a first end 6 and a second end 7. At the first end 6, a substantially straight shank portion 13 protrudes from a handle 12.

Figure 4:
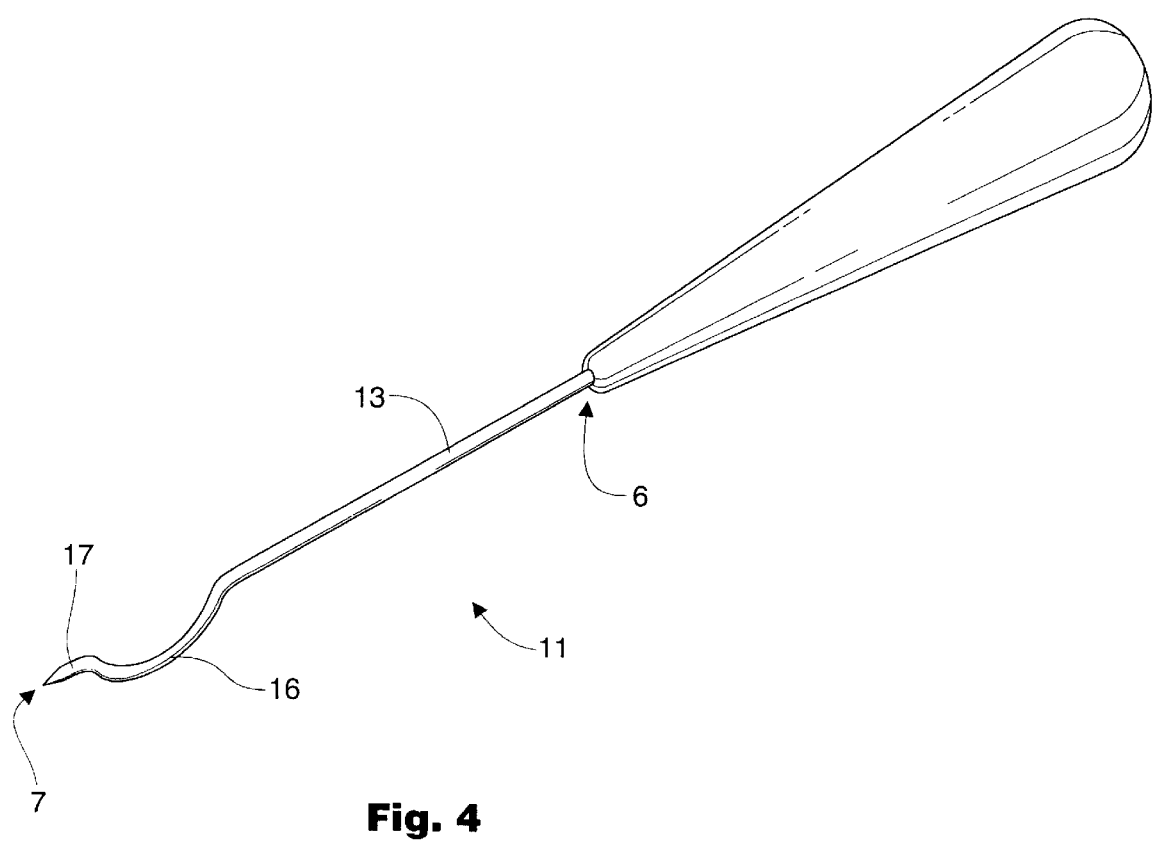
FIG. 4 is a perspective view of the present invention with a smooth shank portion 13.

FIG. 4 is a perspective view of the present invention with a smooth shank portion 13. The shank portion 13 may include notches 14 as shown in FIG. 2, or may be smooth as shown in FIG. 4. The elongated member 11 extends from the shaft 13 to form an arcuate portion 16 near the second end 7 of the tool 10. The tool 10 terminates at the second end 7 with a substantially straight portion 17 that is substantially coaxial with the shank portion 13. The second end 7 may be flat as shown in FIG. 2, or may be pointed as shown in FIG. 4.

Referring again to FIGS. 1 and 3, the drum brake tool 10, when used as intended, is inserted through a self adjuster port 5A located in a brake assembly back plate 5B. The tool 10 is then guided above the threaded shaft assembly 5C until the second end 7 urges against the ratchet pawl 5D. The arcuate portion 16 of the tool 10 is directed around the cylindrical threaded shaft assembly 5C from above. The tool 10 is urged against the ratchet pawl 5D until the ratchet pawl 5D is moved away from the ratchet wheel teeth 5E, thereby allowing free rotation of the ratchet wheel 5F. In one embodiment of the present invention, notches 14 in the shaft 13 engage an edge 5G of the self adjuster port 5A to hold the tool 10 in place, with the ratchet pawl 5D disengaged from the ratchet wheel teeth 5E.

When the second end 7 is pointed as shown in FIG. 4, the second end 7 may be urged against the ratchet pawl 5D until the second end 7 digs slightly into the metal surface of the ratchet pawl 5D, thus engaging the ratchet pawl 5D, thereby helping to prevent the second end 7 from slipping along the surface of the ratchet pawl 5D.

Although the drum brake tool 10 has been shown and described in use with a particular style of drum brake, it can be readily appreciated that the tool 10 is useful with various other styles and configurations of drum brakes.

The foregoing description is included to describe embodiments of the present invention which include the preferred embodiment, and is not meant to limit the scope of the invention. From the foregoing description, many variations will be apparent to those skilled in the art that would be encompassed by the spirit and scope of the invention. Accordingly, the scope of the invention is to be limited only by the following claims and their legal equivalents.

The invention claimed is:

1. A drum brake tool comprising:
   (a) a rigid elongated member having a first end and a second end;

(b) a handle disposed at the first end;

(c) a substantially straight shank portion of the elongated member protruding from the handle;

(d) means for accommodating a threaded shaft mechanism of a drum brake assembly, said accommodating means comprising an arcuate portion having a primary end and a secondary end;

(e) the shank portion terminating at the primary end of the arcuate portion;

(f) the arcuate portion forming a single arc which spans between the primary end and the secondary end of the arcuate portion, and which terminates at the primary and secondary ends;

(g) the arcuate portion adapted to permit the shaft mechanism to pass from one side of the tool to another side of the tool, the shaft mechanism crossing a line which is coaxial with the shank portion and which spans between the primary and secondary ends; and (h) pawl engaging means on said second end of said elongated member, said pawl engaging means comprising a straight portion which is coaxial with the shank portion and which begins at the secondary end of the arcuate portion, and which terminates at the second end of the elongated member.

2. The drum brake tool of claim 1, wherein the shank portion is notched.

3. A drum brake tool comprising:

(a) a rigid elongated member having a first end and a second end;

(b) a handle disposed at the first end;

(c) a substantially straight shank portion of the elongated member protruding from the handle;

(d) the shank portion having notches;

(e) means for accommodating a threaded shaft mechanism of a drum brake assembly, said accommodating means comprising an arcuate portion having a primary end and a secondary end;

(f) the shank portion terminating at the primary end of the arcuate portion;

(g) the arcuate portion forming a single arc which spans between the primary end and the secondary end of the arcuate portion, and which terminates at the primary and secondary ends;

(h) the arcuate portion adapted to permit the shaft mechanism to pass from one side of the tool to another side of the tool, the shaft mechanism crossing a line which is coaxial with the shank portion and which spans between the primary and secondary ends; and (i) pawl engaging means on said second end of said elongated member, said pawl engaging means comprising a straight portion which is coaxial with the shank portion and which begins at the secondary end of the arcuate portion, and which terminates at the second end of the elongated member.

\* \* \* \* \*